United States Patent Office 3,290,074
Patented Dec. 6, 1966

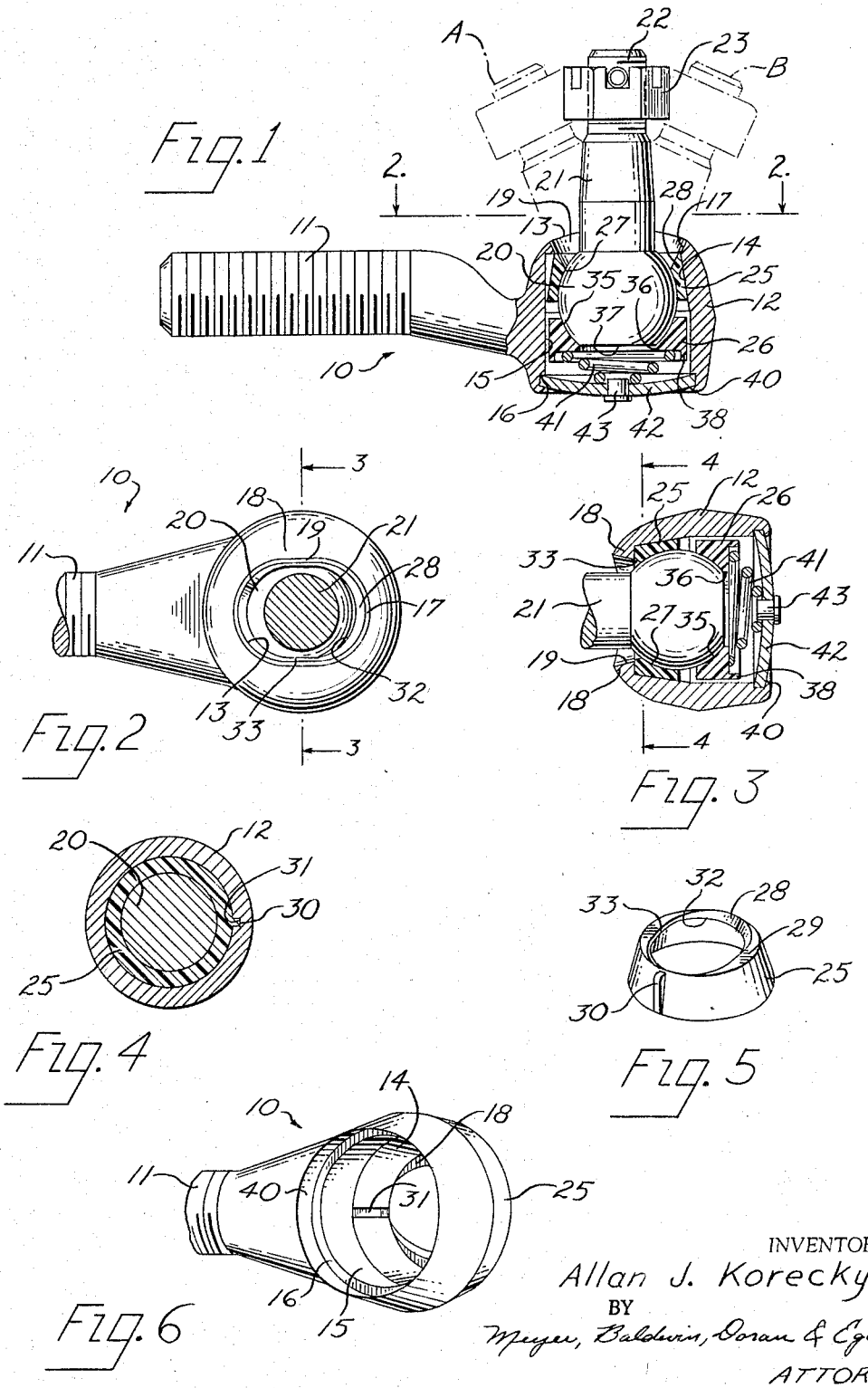

3,290,074
BALL JOINT ASSEMBLIES
Allan J. Korecky, Mayfield Heights, Ohio, assignor to Barmatic Machines, Inc., Cleveland, Ohio, a corporation of Ohio
Filed Mar. 3, 1964, Ser. No. 349,060
1 Claim. (Cl. 287—90)

This invention relates to ball and socket joints and particularly to a ball joint assembly applicable to tie rod ends in automotive steering apparatus.

The invention has for its primary object the provision of a device of the aforesaid nature which is characterized by its structural simplicity, its inexpensive manufacturing costs, the ease of assembly of its parts, and the particularly effective manner in which it performs its function.

More specifically, it is an object of this invention to provide a ball joint assembly of the above type wherein increased wearing surface is provided by the ball seating means.

Another object of the invention is to provide a ball joint assembly as set forth above wherein the ball seat has added strength over that found in ball seats in common use.

Still another object is to provide a ball joint assembly having the above features wherein the seating means is provided with an elliptical opening to afford maximum swinging movement of the ball stud in one direction.

Yet another object is to provide a ball joint assembly having the above characteristics wherein the seating means is locked in one position to assure proper orientation of the direction of maximum swinging movement of the ball stud.

Further objects of the present invention, and a number of its advantages, will be referred to in, or will be evident from, the following description of one embodiment of the invention as illustrated in the accompanying drawings, in which:

FIG. 1 is a side view of a tie rod end embodying the ball joint assembly of this invention and showing such assembly in longitudinal section;

FIG. 2 is a top plan view of the ball joint assembly as seen from the line 2—2 of FIG. 1;

FIG. 3 is a transverse section taken along the line 3—3 of FIG. 2;

FIG. 4 is a section taken along the line 4—4 of FIG. 3;

FIG. 5 is a perspective view of a seating member of the assembly; and

FIG. 6 is a perspective view of the ball joint assembly housing.

Before the device illustrated is specifically described, it is to be understood that the invention here involved is not limited to the structural details or arrangement of parts shown since ball joint assemblies embodying the present invention may take various forms. It is also to be understood that the phraseology or terminology herein employed is for the purpose of description and not of limitation since the scope of the present invention is denoted by the appended claims.

Referring now to the drawings in which like parts are referred to by like reference numerals, FIG. 1 shows a tie rod end generally indicated at 10 and comprising a threaded shank 11 having integrally formed at one end thereof a hollow ball joint housing 12. The housing 12 has an elliptical opening 13 at its upper end, a downwardly diverging, frusto-conical bore portion 14 just below said opening, and a cylindrical bore portion 15 coaxial with and just below said frusto-conical bore portion. Just below the cylindrical bore portion 15, the hollow housing is stepped radially outwardly to provide a circumferentially continuous step 16 just below said cylindrical bore portion. The elliptical opening 13 is provided with bevels 17 at its narrower ends with the longer sides of the ellipse being defined by inwardly projecting lips 18 of the housing projecting inwardly above the bore portion 14. Said lips are provided with bevels 19 at their edges.

The ball joint housing 12 houses a generally spherical ball 20 having an integral ball stud 21 projecting upwardly through the elliptical opening 13. The upper end of the ball stud 21 is provided with a threaded portion 22 carrying a lock nut 23 by means of which the tie rod end is adapted to be connected to the arm of a steering knuckle or the like.

Seating means for the ball 20 are carried inside the hollow housing 12 and comprise a tapered seating member 25, seated within the frusto-conical bore portion 14, and an axially spaced, cylindrical seating member 26 disposed within the cylindrical bore portion 15. The tapered seating member 25 has a frusto-conical outer surface whereby it closely and snugly interfits the bore portion 14. The inner surface of the seating member 25 is formed as part of a sphere whereby to provide a seat 27 for receiving the upper portion of the ball 20. The upwardly directed end of the seating member 25 has an elliptical opening 32 which is provided with bevels as indicated at 28 at its narrower ends in such manner as to allow the ball stud 21 to be pivoted in a direction aligned with the axis of the threaded shank 11, as shown by the dotted line positions A and B in FIG. 1. It will be noted that corresponding portions of the elliptical opening 13 are provided with the bevels 17 so that the housing 12 does not interfere with the pivoting of said stud.

The perspective view of FIG. 5 shows the tapered seat portion 25 alone clearly illustrating the manner in which it is provided with bevels 28 opposite to each other whereby the ball stud 21 is pivotable a maximum distance in one plane. The bevels 28 do not extend all the way around the upwardly directed end of the seating member 25 but rather blend into the sides of the opening thereby leaving inwardly projecting lips 29 having slight bevels 33 disposed at diametrically opposite positions on the tapered seating member in a direction disposed at right angles to the direction of greatest pivotal movement of the ball stud 21. In other words, the ball stud 21 can pivot back and forth in a direction parallel with the threaded shank 11 a substantial distance but is relatively more restricted in its lateral pivotal movement due to the laterally disposed lips 29.

The outer surface of the tapered seating member 25 has an outwardly projecting lug 30 which extends substantially the axial length of said seating member with its outer surface being in alignment with the cylindrical bore portion 15. As is shown in the perspective view of FIG. 6, the frusto-conical bore portion 14 has a complementary recess or slot 31 in the surface thereof, said slot being adapted to receive the lug 30. The slot 31 is aligned with the axis of the threaded shank 11, and the lug 30 is positioned centrally relative to one of the bevels 28. When the lug 30 is seated in the slot 31, the bevels 28 are automatically aligned with the threaded shank 11, and the elliptical openings 13 and 32 are in registry whereby the direction of maximum pivotal movement of the ball stud 21 is automatically disposed in alignment with said threaded shank. The lug 30 rotatably locks the tapered seating member 25 within the frusto-conical bore portion 14 whereby the orientation of said seating member and the bevels 28 remains fixed in use of the ball joint assembly of this invention.

The cylindrical seating member 26 loosely interfits the cylindrical bore 15 of the housing 12 and has an inner seat 35 which defines a portion of a sphere and is adapted to seat the lower end of the ball 20 as it is shown in FIG. 1. A short, coaxial through-bore 36 is provided at the bottom of the seat 35, and the ball 20 has a flattened, lower end surface 37 disposed substantially at the upper end of the short through-bore. The downwardly directed end of the cylindrical seating member 26 has a circumferential collar 38 formed integrally therewith adjacent to the outer periphery of said cylindrical seating member.

As the ball joint housing 12 is originally formed, it is provided with a circumferential lip 40 which extends outwardly beyond the step 16 as best illustrated in FIG. 6. The ball joint assembly is assembled by first inserting the tapered seating member 25 into the frusto-conical bore portion 14 with the lug 30 seated within the recess or slot 31 whereby said tapered seat portion is properly oriented. The ball 20 is then placed in the hollow housing 12 with the ball stud 21 projecting outwardly through and beyond the elliptical openings 13 and 32. The cylindrical seating member 26 is then inserted with the inner seat 35 embracing the ball 20. A conical coil spring 41 is then seated with its larger end against the cylindrical seating member 26 within the collar 38. A downwardly convex disk 42 having a center plug 43 is then seated upon the circumferential step 16 after which the lip 40 is swaged over the peripheral edge portion of said disk. The conical coil spring 41 is substantially compressed by the disk 42 whereby the ball 20 is resiliently, captively held between the tapered seating member 25 and the cylindrical seating member 26.

As well shown in FIG. 2, in the assembled condition the elliptical opening 13 of the housing 12 is in registry with the elliptical opening 32 of the tapered seating member 25. The bevels 17 of said housing are aligned with the bevels 28 of said tapered seating member thereby allowing maximum pivotal movement of the ball stud 21 in one direction. The lips 18 of the housing overlap but do not extend inwardly beyond the lips 29 of said tapered seating member, and the bevels 19 are disposed immediately above the bevels 33 of said lips 29. This arrangement allows a maximum of pivotal movement of the ball stud 21 back and forth between the bevels 28 and 17 with a substantially lesser amount of movement allowed in the transverse direction between the bevels 19 and 33.

In the form of the invention herein illustrated and described, the bevels 17 of the housing and the bevels 28 of the tapered seating member are disposed at an angle of substantially 25° relative to the axis of said housing and said seating member. The bevels 19 and 33 are disposed at an angle of substantially 12° relative to said axis, and the elliptical openings 13 and 32 are sufficiently large to allow this much movement of the ball stud. Therefore, the ball stud 21 has a maximum pivotal movement in one direction of substantially 50° and a minimum pivotal movement in a transverse direction of substantially 24°.

The seating members 25 and 26 are preferably formed or made of plastic such as an acetal resin, a comparatively hard, strong, and long wearing material which at the same time is resilient and is dimensionally stable when exposed to moisture and heat. This polymer is highly resistant to chemicals and solvents and, when provided with a high gloss finish, affords a slippery, low friction surface.

It will be seen that the elliptical opening 32 affords maximum movement of the ball stud 21 in the direction desired while at the same time increasing the bearing surface of the seat 27 against the ball 20 by the lips 29 which extend over the surface of the ball a greater extent than would be true of an ordinary circular opening. The lips 29 also serve to reinforce and generally strengthen the seating member 25. The tapered seating member 25 is always locked in position by the lug 30 whereby it is always properly oriented to afford maximum movement of the ball stud in the desired direction. Wear in either of the seating members is automatically taken up by the conical spring 41 which constantly biases the axially spaced seating members together.

It will be understood that many changes in the details of the invention as herein described and illustrated may be made without, however, departing from the spirit thereof or the scope of the appended claim.

What is claimed is:

A ball joint assembly, comprising a hollow housing having openings at the upper and lower ends thereof; said housing comprising successively from said upper to said lower end of said housing an elliptical opening, an upwardly converging frusto-conical housing bore portion, a coaxial cylindrical housing bore portion, and a diametrically outwardly formed annular step; an annular externally tapered seating member complementarily interfitting said frusto-conical housing bore portion and having an elliptical opening in its upper end in registry with the elliptical opening of the housing; an outwardly projecting axially tapered lug externally carried by the external tapered surface of said tapered seating member at one end of the elliptical opening thereof and interlocked with an axial slot in said frusto-conical housing bore portion to thereby prevent relative rotation of said tapered seating member and said housing, said lug extending substantially the major portion of the axial length of said seating member with its outer surface being parallel with and in contiguous axial alignment with the cylindrical bore portion; an externally cylindrical seating member disposed within and spaced from said cylindrical housing bore portion; a ball member to which the inner surfaces of said tapered and cylindrical seating members conform and which inner surfaces of said seating members rotatably and tiltably receive said ball member; said ball member having a stud projecting through said tapered seating member and outwardly through the upper elliptical housing opening; a disk member seated upon the step of said housing; means for securing said disk member and said housing seat in assembled relation; and a coiled spring cooperatively disposed between said disk member and said cylindrical seating member and biasing said cylindrical seating member toward said tapered seating member.

References Cited by the Examiner

UNITED STATES PATENTS

| | | |
|---|---|---|
| 2,461,866 | 2/1949 | Alldredge. |
| 2,841,428 | 7/1958 | Moskovitz. |
| 3,090,642 | 5/1963 | Gottschald et al. |
| 3,154,333 | 10/1964 | Townsend _____ 287—87 |

FOREIGN PATENTS

| | | |
|---|---|---|
| 423,716 | 2/1935 | Great Britain. |
| 737,811 | 10/1955 | Great Britain. |
| 884,278 | 12/1961 | Great Britain. |

THOMAS F. CALLAGHAN, *Primary Examiner.*

A. V. KUNDRAT, *Assistant Examiner.*